US011620273B2

(12) United States Patent
Turányi et al.

(10) Patent No.: US 11,620,273 B2
(45) Date of Patent: Apr. 4, 2023

(54) MESSAGE PROCESSING NODE AND DATABASE IN A MESSAGE PROCESSING SYSTEM AND METHODS OF OPERATING THE SAME

(71) Applicant: Telefonaktiebolaget LM Ericsson (publ), Stockholm (SE)

(72) Inventors: Zoltán Turányi, Szentendre (HU); Göran Hall, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1087 days.

(21) Appl. No.: 15/754,518

(22) PCT Filed: Aug. 27, 2015

(86) PCT No.: PCT/EP2015/069626
§ 371 (c)(1),
(2) Date: Feb. 22, 2018

(87) PCT Pub. No.: WO2017/032418
PCT Pub. Date: Mar. 2, 2017

(65) Prior Publication Data
US 2018/0285404 A1 Oct. 4, 2018

(51) Int. Cl.
*G06F 16/00* (2019.01)
*G06F 16/23* (2019.01)
(Continued)

(52) U.S. Cl.
CPC .......... *G06F 16/2343* (2019.01); *G06F 9/466* (2013.01); *G06F 9/546* (2013.01); *G06F 16/2336* (2019.01); *G06F 16/289* (2019.01)

(58) Field of Classification Search
CPC ............. G06F 16/2343; G06F 16/2336; G06F 16/289; G06F 9/466; G06F 9/546
See application file for complete search history.

(56) References Cited

U.S. PATENT DOCUMENTS 6,449,734 B1 * 9/2002 Shrivastava ........ G06F 11/1425
714/15
2005/0289143 A1* 12/2005 Oshri ...................... G06F 17/00
(Continued)

FOREIGN PATENT DOCUMENTS

WO 8808571 A1 11/1988

OTHER PUBLICATIONS

Karger, David et al., "Web Caching with Consistent Hashing", Computer Networks: The International Journal of Computer and Telecommunications Networking, vol. 31, Issue 11-16, May 1999, 1-17.

(Continued)

*Primary Examiner* — Paul Kim
(74) *Attorney, Agent, or Firm* — Murphy, Bilak & Homiller, PLLC

(57) ABSTRACT

There is provided a method of operating a message processing node in a message processing system. Upon receipt of a message for a transaction referring to an object for which a record is stored in a database (300), a request is sent to the database to lock the record for the object (302). Where the record is unlocked, a message is received from the database indicating that the request to lock the record is successful (304) and the received message for the transaction is processed (306). Where the record has been locked previously by another message processing node, a message is received from the database indicating that the request to lock the record is unsuccessful and identifying the message processing node to which the record is locked (308) and the received message for the transaction referring to the object is forwarded to the identified message processing node (310).

11 Claims, 10 Drawing Sheets

(51) Int. Cl.
  *G06F 16/28* (2019.01)
  *G06F 9/46* (2006.01)
  *G06F 9/54* (2006.01)

(56) References Cited

U.S. PATENT DOCUMENTS

2006/0123065 A1* 6/2006 Rapp .................. G06F 16/2343
2009/0282043 A1* 11/2009 Dharmavaram .... G06F 16/2343
2010/0023521 A1   1/2010 Arcese et al.
2014/0089346 A1   3/2014 Li

OTHER PUBLICATIONS

Thaler, David G. et al., "Using Name-based Mappings to Increase Hit Rates", IEEE/ACM Transactions on Networking, vol. 6, Issue 1, Feb. 1998, 1-19.
Unknown, Author, "Consistent Hashing", Wikipedia, http://en.wikipedia.org/wiki/Consistent_hashing, Feb. 2, 2018, 1-4.
Unknown, Author, "Rendezvous Hashing", Wikipedia, http://en.wikipedia.org/wiki/Rendezvous_hashing, Nov. 28, 2017, 1-7.

* cited by examiner

MESSAGE PROCESSING NODE AND DATABASE IN A MESSAGE PROCESSING SYSTEM AND METHODS OF OPERATING THE SAME

TECHNICAL FIELD

The present invention relates to a message processing node and a database for use in a message processing system and methods for operating the same.

BACKGROUND

A message processing system comprises message processing nodes (for example, servers, computing platforms, etc) that handle objects (for example, users, bearers, subscribers, or any other entity having a state and being subject to processing in the system). A message processing system also comprises a database that stores records for objects that are accessible by the message processing nodes of the system. Certain message processing nodes are assigned the responsibility for handling transactions on certain objects. A transaction is a unit of work performed on the objects within the message processing system and may consist of a plurality of messages which, when processed, result in completion of a particular task on the object. For example, the messages may make it necessary to access a record for the object in the database in order to perform a certain task such as reading data for the object and/or writing data for the object. A load balancer in the message processing system has knowledge of which message processing node is responsible for handling transactions of which object.

It may be necessary that the responsibility for an object is reassigned between message processing nodes in the message processing system. For example, scaling may be required to re-distribute the load within the message processing system or a failure of the currently responsible message processing node may require re-distribution of the messages to be processed.

In order to reassign the responsibility for an object between message processing nodes, it is often necessary to transfer information that identifies the current state associated with the object during a transaction (i.e. the intra-transaction state) for ongoing messages between message processing nodes. However, the transfer of intra-transaction state information increases the load on the system and creates long transaction processing times. This may be avoided by redirecting subsequent messages of an ongoing transaction to the responsible message processing node that began processing the transaction. However, this makes load balancing difficult since the redirecting of subsequent messages will cause a further load unbalance. Another option to avoid having to transfer intra-transaction state information may be to store intra-transaction states in a backend database of the message processing system. However, again, this would result in an increased load on the system and longer processing times.

Alternatively, in order to reassign the responsibility for an object between message processing nodes, it may be necessary to postpone the reassignment until there are no ongoing transactions for the object. However, the postponement will delay load balancing and data would be lost if the purpose of the reassignment is due to a failure of the responsible message processing node. Also, postponement would require a load balancer of the system to understand transaction semantics for the object, which would make the load balancer more complex.

These problems may be apparent in applications relating to cloud technology. The problems are also particularly apparent in telecommunications applications such as Evolved Packet Core (EPC) or Internet Protocol Multimedia Subsystem (IMS) applications, which do not follow a simple request-response transaction model. Instead, in these applications, a transaction often contains multiple messages or involves asking another entity for information and then responding based on the received information. Another problem is that transactions for the same object may be started from multiple sources asynchronously. These type of events need to be detected and correlated.

There are certain algorithms that attempt to solve these problems. For example, one such algorithm is consistent hashing and another is rendezvous hashing. An algorithm for consistent hashing is disclosed in "Web Caching with Consistent Hashing" by D. Karger et al, *Computer Networks* (1999) and an algorithm for rendezvous hashing is disclosed in "Using Name-Based Mapping Schemes to Increase Hit Rates", D. Thaler et al, *IEEE/ACM Transactions on Networking* (1998). However, these attempts have been unsuccessful in eliminating the problems described above since there are still changes to the message processing node responsible for processing an object when scaling or failure events occur. In particular, the aim of scaling is to re-distribute load in the message processing system, which requires a change in the message processing node that processes transactions for certain objects. Similarly, in case of a failure of a message processing node, it is necessary for another message processing node to process the messages that were originally assigned to the message processing node that subsequently failed.

SUMMARY

It is an object of the invention to obviate or eliminate at least some of the above disadvantages and provide an improved means for processing messages of transactions for objects in a message processing system. In particular, it is an aim of the invention to eliminate the necessity to transfer or store intra-transaction state information in a message processing system to thereby provide a near stateless processing model for complex transactions. The invention is aimed at providing support for scaling and failure events that occur in a message processing system.

According to an aspect of the invention, there is provided a method of operating a message processing node in a message processing system. The method comprises, upon receipt of a message for a transaction referring to an object for which a record is stored in a database, sending a request to the database to lock the record for the object. Where the record for the object is unlocked, a message is received from the database indicating that the request to lock the record for the object is successful and the received message for the transaction is processed. Where the record for the object has been locked previously by another message processing node, a message is received from the database indicating that the request to lock the record for the object is unsuccessful and identifying the message processing node to which the record for the object is locked, and the received message for the transaction referring to the object is forwarded to the identified message processing node.

In this way, the invention provides an improved means for processing messages of transactions for objects in a message processing system. The necessity to transfer or continuously store intra-transaction state information in the message processing system is eliminated. A message processing node need only hold transaction state information during a transaction. In this way, the load on the system is lowered, processing times are faster and there is no delay in load balancing or loss of data where a message processing node has failed. The invention enables a near-stateless processing model for complex transactions, which is capable of providing scaling and failover support to the message processing system. It is possible to achieve stateless load-balancing, whilst still progressing transactions at a single message processing node without intra-transaction state relocation even where there are multiple asynchronous transactions or where scaling and/or failure events occur.

The method may further comprise determining whether forwarding the received message for the transaction referring to the object is successful. In response to determining that forwarding the received message for the transaction referring to the object is unsuccessful, the method may comprise sending a request to the database requesting that the identity of the message processing node to which the record for the object is locked is changed to the identity of the message processing node. In this way, the message processing node is aware that the received message has not been successfully forwarded (and thus processed) and can attempt to take control of the record for the object to process the message for the transaction itself. That way, even if the message processing node to which the record for the object is locked fails, the received message will not be lost and attempts can be made to process the message in order to complete the transaction or even begin a new transaction on the object for which the record is locked in the database.

In an embodiment, wherein the request to the database to change the identity of the message processing node to which the record for the object is locked to the identity of the message processing node is successful, the method further comprises processing the message relating to the object and subsequent messages for the transaction referring to the object by the message processing node until the transaction referring to the object is complete. In this way, the message processing node takes over from the message processing node that had previously locked the record for the object in order to continue processing messages for the transaction and thus complete the transaction. The transaction can be completed even in the situation where the previous node has failed.

In another embodiment, wherein the request to the database to change the identity of the message processing node to which the record for the object is locked to the identity of the message processing node is unsuccessful, the method further comprises re-forwarding the received message for the transaction referring to the object to the message processing node identified in the message received from the database as the message processing node to which the record for the object is locked. In this way, even if the message processing node is unable to take control of the lock on the record for the object, the message processing node continues to make attempts for the received message to be successfully processed.

The method may further comprise, in response to determining that forwarding the received message for the transaction referring to the object is successful, removing the received message and subsequent messages for the transaction referring to the object stored in a storage unit of the message processing node from the storage unit. In this way, the message processing node only holds transaction state information during a transaction. This increases the storage space available in the message processing node and also reduces the overall load on the system and reduces processing times.

The method may further comprise, upon receipt of a message for a transaction referring to an object for which a record is stored in a database, determining whether the message processing node is responsible for processing the transaction and, where the message processing node is responsible for processing the transaction, the method comprises processing the received message for the transaction. In this way, the message processing node is able to take immediate control to process the message without delay.

The received message and subsequent messages for the transaction referring to the object may be processed until the transaction referring to the object is complete. In this way, the message processing node will process each message to ensure that a transaction is completed and no data is lost.

The method may further comprise storing the received message and subsequent messages for the transaction referring to the object in a storage unit of the message processing node until the transaction referring to the object is complete. In this way, the message processing node has the information available regarding the state of the transaction during the transaction itself, which enables the message processing node to maintain smooth and uninterrupted processing of messages until completion of the transaction. The information may also be useful should the message processing node fail and it is only kept until the transaction is complete such that it does not take up unnecessary memory space.

The method may further comprise, upon completion of the transaction referring to the object, sending a message to the database indicating the transaction referring to the object is complete. In this way, the database is provided with immediate confirmation that the lock on the entry for the object is no longer necessary since the transaction has successfully completed.

According to another aspect of the invention, there is provided a method of operating a database in a message processing system. The method comprises receiving from a message processing node a request to lock a record for an object and checking whether the record for the object is locked by another message processing node. Where the record for the object is locked by another message processing node, a message is sent to the message processing node indicating that the request to lock the record for the object is unsuccessful and identifying the message processing node to which the record for the object is locked. Where the record for the object is unlocked, the record for the object is locked, the identity of the message processing node is assigned to the record and a message is sent to the message processing indicating that the request to lock the record for the object is successful.

In this way, the invention provides an improved means for processing messages of transactions for objects in a message processing system. The necessity to transfer or continuously store intra-transaction state information in the message processing system is eliminated. In this way, the load on the system is lowered, processing times are faster and there is no delay in load balancing or loss of data where a message processing node has failed. The invention enables a near-stateless processing model for complex transactions, which is capable of providing scaling and failover support to the message processing system. It is possible to achieve stateless load-balancing, whilst still progressing transactions at a single message processing node without intra-transaction state relocation even where there are multiple asynchronous transactions or where scaling and/or failure events occur.

The method may further comprise receiving a request from the message processing node requesting that the identity of the message processing node to which the record for the object is locked is changed to the identity of the message processing node and determining whether to allow the request. In this way, the database has the ability to allow another message processing node to take over responsibility for a transaction, which is particularly useful in a case where the previously responsible message processing node has failed or has been reassigned due to a redistribution of the load in the system.

The record for the object is locked until the transaction is complete. In this way, the transaction can be completed as efficiently and securely as possible since only the message processing node that is currently processing the transaction will be able to access the record for the object while the transaction is still ongoing.

The method may further comprise receiving a message from the message processing node indicating the transaction referring to the object is complete and, in response to receiving the message, unlocking the record for the object. In this way, the record for the object is only inaccessible to other message processing nodes during a transaction. Where there is no transaction on the object in progress, the record for the object is released such that any message processing node is again able to access the record for the object. This provides a more efficient and secure message processing system.

According to another aspect of the invention, there is provided a message processing node. The message processing node comprises a communications interface operable to, upon receipt of a message for a transaction referring to an object for which a record is stored in a database, send a request to the database to lock the record for the object. The message processing node also comprises a processing unit operable to process the message according to whether the request to lock the record for the object is successful. Where the record for the object is unlocked, the communication interface is operable to receive a message from the database indicating that the request to lock the record for the object is successful and the processing unit is operable to process the received message for the transaction referring to the object. Where the record for the object is locked by another message processing node, the communication interface is operable to receive a message from the database indicating that the request to lock the record for the object is unsuccessful and identifying the message processing node to which the record for the object is locked, and the processing unit is operable to forward the received message for the transaction referring to the object to the identified message processing node.

In this way, the invention provides an improved means for processing messages of transactions for objects in a message processing system. The necessity to transfer or continuously store intra-transaction state information in the message processing system is eliminated. A message processing node need only hold transaction state information during a transaction. In this way, the load on the system is lowered, processing times are faster and there is no delay in load balancing or loss of data where a message processing node has failed. The invention enables a near-stateless processing model for complex transactions, which is capable of providing scaling and failover support to the message processing system. It is possible to achieve stateless load-balancing, whilst still progressing transactions at a single message processing node without intra-transaction state relocation even where there are multiple asynchronous transactions or where scaling and/or failure events occur.

The processing unit may be further operable to determine whether forwarding the received message for the transaction referring to the object is successful. The communication interface may be further operable to, in response to the processing unit determining that forwarding the received message for the transaction referring to the object is unsuccessful, send a request to the database requesting that the identity of the message processing node to which the record for the object is locked is changed to the identity of the message processing node. In this way, the message processing node is aware that the received message has not been successfully forwarded (and thus processed) and can attempt to take control of the record for the object to process the message for the transaction itself. That way, even if the message processing node to which the record for the object is locked fails, the received message will not be lost and attempts can be made to process the message in order to complete the transaction or even begin a new transaction on the object for which the record is locked in the database.

In one embodiment, wherein where the request to the database to change the identity of the message processing node to which the record for the object is locked to the identity of the message processing node is successful, the processing unit may be operable to process the message relating to the object and subsequent messages for the transaction referring to the object until the transaction referring to the object is complete. In this way, the message processing node takes over from the message processing node that had previously locked the record for the object in order to continue processing messages for the transaction and thus complete the transaction. The transaction can be completed even in the situation where the previous node has failed.

In another embodiment, wherein where the request to the database to change the identity of the message processing node to which the record for the object is locked to the identity of the message processing node is unsuccessful, the processing unit may be operable to re-forward the received message for the transaction referring to the object to the message processing node identified in the message received from the database as the message processing node to which the record for the object is locked. In this way, even if the message processing node is unable to take control of the lock on the record for the object, the message processing node continues to make attempts for the received message to be successfully processed.

The message processing node may further comprise a storage unit operable to store the received message and subsequent messages for the transaction referring to the object of the message processing node until the transaction referring to the object is complete. In this way, the message processing node will process each message to ensure that a transaction is completed and no data is lost.

According to another aspect of the invention, there is provided a database. The database comprises a storage unit operable to store a record for a plurality of objects. The database also comprises a communications interface operable to receive from a message processing node a request to lock a record for an object and a processing unit operable to check whether the record for the object is locked by another message processing node. Where the record for the object is locked by another message processing node, the communications interface is operable to send a message to the message processing node indicating that the request to lock the record for the object is unsuccessful and identifying the message processing node to which the record for the object is locked. Where the record for the object is unlocked, the processing unit is operable to lock the record for the object and assign the identity of the message processing node to the record, and the communications interface is operable to send a message to the message processing node indicating that the request to lock the record for the object is successful.

In this way, the invention provides an improved means for processing messages of transactions for objects in a message processing system. The necessity to transfer or continuously store intra-transaction state information in the message processing system is eliminated. In this way, the load on the system is lowered, processing times are faster and there is no delay in load balancing or loss of data where a message processing node has failed. The invention enables a near-stateless processing model for complex transactions, which is capable of providing scaling and failover support to the message processing system. It is possible to achieve stateless load-balancing, whilst still progressing transactions at a single message processing node without intra-transaction state relocation even where there are multiple asynchronous transactions or where scaling and/or failure events occur.

The communications interface may be further operable to receive a request from the message processing node requesting that the identity of the message processing node to which the record for the object is locked is changed to the identity of the message processing node and the processing unit may be further operable to determine whether to allow the request. In this way, the database has the ability to allow another message processing node to take over responsibility for a transaction, which is particularly useful in a case where the previously responsible message processing node has failed or has been reassigned due to a redistribution of the load in the system.

The communications interface may be operable to receive a message from the message processing node indicating the transaction referring to the object is complete and the processing unit may be operable to, in response to receiving the message, unlock the record for the object. In this way, the record for the object is only inaccessible to other message processing nodes during a transaction. Where there is no transaction on the object in progress, the record for the object is released such that any message processing node is again able to access the record for the object. This provides a more efficient and secure message processing system.

According to another aspect of the invention, there is provided a message processing node. The method processing node comprises a first module configured to, upon receipt of a message for a transaction referring to an object for which a record is stored in a database, send a request to the database to lock the record for the object. Where the record for the object is unlocked, a second module is configured to receive a message from the database indicating that the request to lock the record for the object is successful and a third module is configured to process the received message for the transaction referring to the object. Where the record for the object is locked by another message processing node, a fourth module is configured to receive a message from the database indicating that the request to lock the record for the object is unsuccessful and identifying the message processing node to which the record for the object is locked, and a fifth module is configured to forward the received message for the transaction referring to the object to the identified message processing node.

According to another aspect of the invention, there is provided database. The database comprises a first module configured to store a record for a plurality of objects, a second module configured to receive from a message processing node a request to lock a record for an object, and a third module configured to check whether the record for the object is locked by another message processing node. Where the record for the object is locked by another message processing node, a fourth module is configured to send a message to the message processing node indicating that the request to lock the record for the object is unsuccessful and identifying the message processing node to which the record for the object is locked. Where the record for the object is unlocked, a fifth module is configured to lock the record for the object and assign the identity of the message processing node to the record, and a sixth module is configured to send a message to the message processing node indicating that the request to lock the record for the object is successful.

According to another aspect of the invention, there is provided a message processing system comprising a database as defined above and at least one message processing node as defined above.

According to another aspect of the invention, there is provided a computer program product, comprising a carrier containing instructions for causing a processor to perform a method as defined above.

According to these aspects, the invention provides an improved means for processing messages of transactions for objects in a message processing system. The necessity to transfer or continuously store intra-transaction state information in the message processing system is eliminated. In this way, the load on the system is lowered, processing times are faster and there is no delay in load balancing or loss of data where a message processing node has failed. The invention enables a near-stateless processing model for complex transactions, which is capable of providing scaling and failover support to the message processing system. It is possible to achieve stateless load-balancing, whilst still progressing transactions at a single message processing node without intra-transaction state relocation even where there are multiple asynchronous transactions or where scaling and/or failure events occur.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
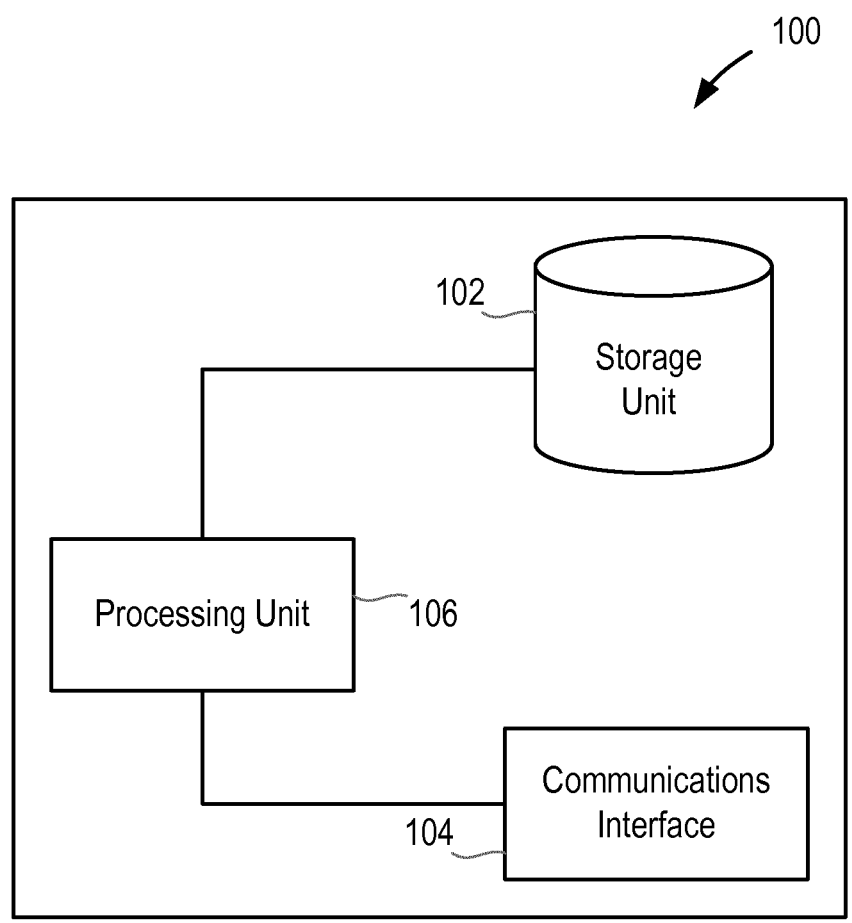
FIG. 1 is a block diagram illustrating a message processing node for use in a message processing system in accordance with the invention.

FIG. 1 illustrates a message processing node 100 for use in a message processing system in accordance with the invention. The node 100 comprises a storage unit 102 and a communications interface 104, which are connected to a processing unit 106 of the node 100.

Figure 2:
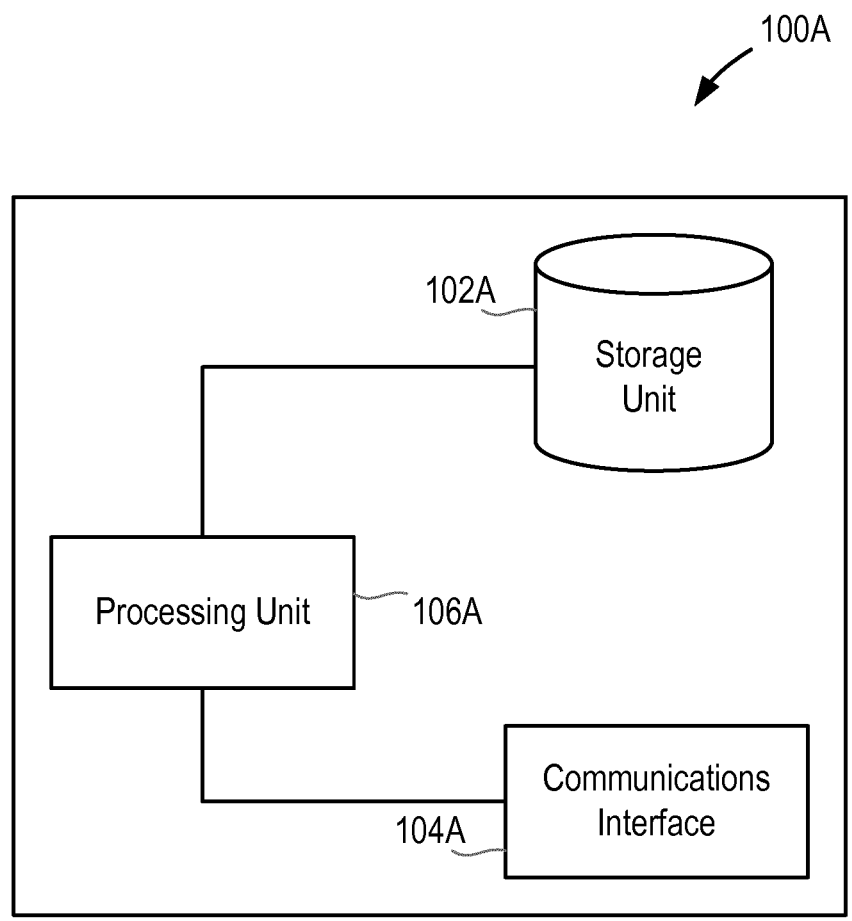
FIG. 2 is a block diagram illustrating a database for use in a message processing system in accordance with the invention.

FIG. 2 is a block diagram illustrating a database 100A for use in the message processing system in accordance with the invention. The database 100A comprises a storage unit 102A and a communications interface 104A, which are connected to a processing unit 106A of the database 100A.

Figure 3:
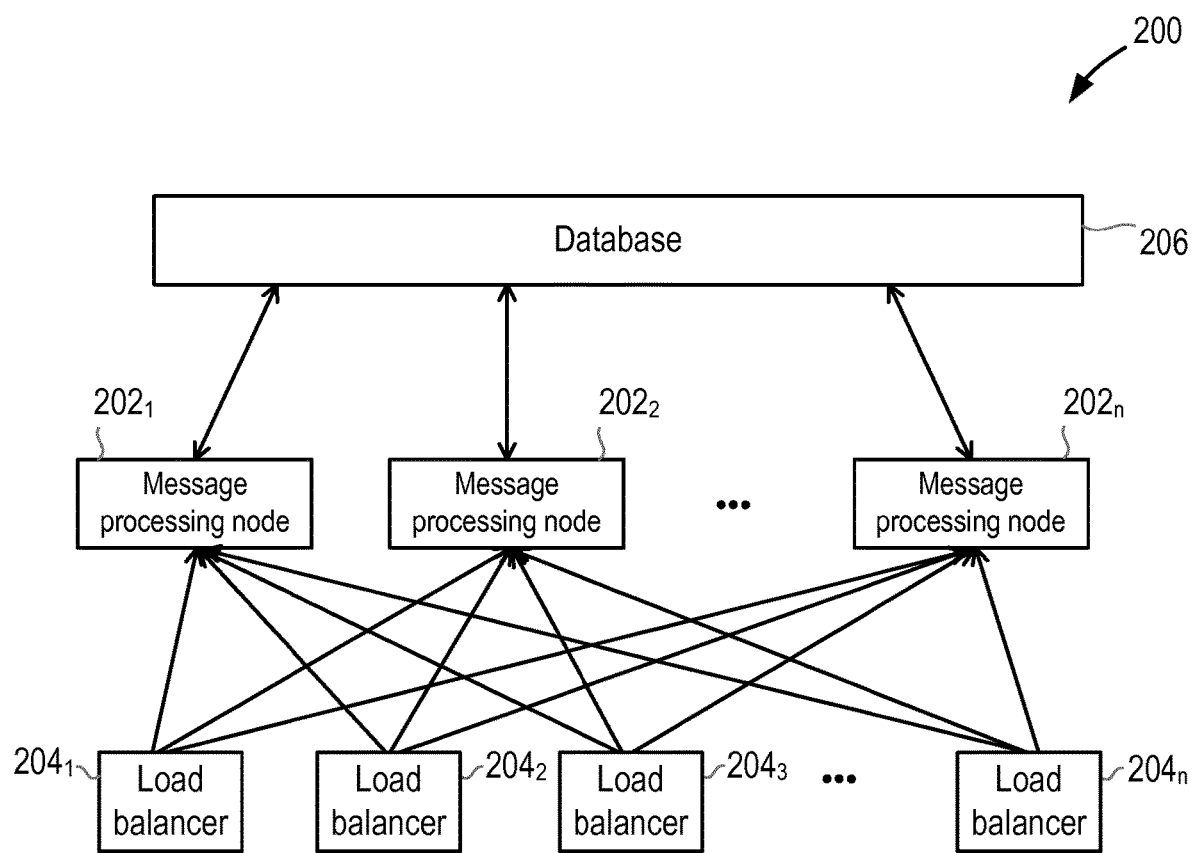
FIG. 3 is a block diagram illustrating a message processing system in which the message processing node and database may be used in accordance with the invention.

FIG. 3 illustrates an example of system architecture for a message processing system in accordance with an embodiment of the invention. The message processing system 200 is operable to perform transactions on objects.

With reference to FIG. 3, the message processing system 200 comprises a database 206 (such as a backend database). The database 206 has the configuration of the database 100A shown in FIG. 2. The message processing system 200 also comprises at least one message processing node $202_1$, $202_2$, $202_n$. The message processing node $202_1$, $202_2$, $202_n$ has the configuration of the message processing node 100 shown in FIG. 1. The message processing nodes $202_1$, $202_2$, $202_n$ are connected to the database 206 and are operable to receive and process messages for transactions that refer to objects having a record stored in the database 206. The state associated with an object is stored in the message processing nodes $202_1$, $202_2$, $202_n$, the database 206, the cloud, and/or the like. However, in general, the state associated with an object is stored in the database 206, while intermittent additional states that are relevant during the processing of a transaction (i.e. intra-transaction states) are stored in the message processing node $202_1$, $202_2$, $202_n$ that is processing the transaction.

Each object has a unique identifier or a set of identifiers that uniquely identify the object. For example, in the case of an Evolved Packet Core (EPC) system, the unique identifier may be an International Mobile Subscriber Identity (IMSI) of a subscriber or a Globally Unique Temporary Identifier (GUTI) and, in the case of an Internet Protocol Multimedia Subsystem (IMS) system, the unique identifier may be a Session Initiation Protocol (SIP) address of a user, etc. An object can have multiple identifiers, which are mapped to a single identity for transactions using the different identifiers. The message processing nodes $202_1$, $202_2$, $202_n$ may in turn query and update the state of an object record in the database 206.

The message processing system 200 also comprises at least one load balancer $204_1$, $204_2$, $204_3$, $204_n$ operable to communicate with the plurality of message processing nodes $202_1$, $202_2$, $202_n$. The load balancers $204_1$, $204_2$, $204_3$, $204_n$ are responsible for incoming traffic and distribute (and redistribute) the load among the message processing nodes $202_1$, $202_2$, $202_n$ of the message processing system 200.

For example, the load balancers $204_1$, $204_2$, $204_3$, $204_n$ are operable to distribute the load of the message processing system 200 by directing messages for transactions that refer to objects having a record stored in the database 206 to certain message processing nodes $202_1$, $202_2$, $202_n$. The load balancers $204_1$, $204_2$, $204_3$, $204_n$ use the object identifier to select a message processing node $202_1$, $202_2$, $202_n$ to process an initial (i.e. opening) message for a transaction referring to an object. The message processing node $202_1$, $202_2$, $202_n$ that is selected to process the initial message for a transaction is referred to as the responsible message processing nodes $202_1$, $202_2$, $202_n$ for the object referred to in the initial message for the transaction. The load balancers $204_1$, $204_2$, $204_3$, $204_n$ can be stateless in that they do not have knowledge about the state of objects. Instead, the load balancers $204_1$, $204_2$, $204_3$, $204_n$ select the same message processing node $202_1$, $202_2$, $202_n$ to handle messages referring to the same object identity.

Where scaling of the load is required or where a message processing node $202_1$, $202_2$, $202_n$ fails, the load balancers $204_1$, $204_2$, $204_3$, $204_n$ are operable to redistribute the load within the message processing system 200 such as by redirecting the messages for transactions to different message processing nodes $202_1$, $202_2$, $202_n$.

In an embodiment, the load balancers $204_1$, $204_2$, $204_3$, $204_n$ distribute (or redistribute) the load among the message processing nodes $202_1$, $202_2$, $202_n$ of the message processing system 200 using a hash of relevant and available message parameters (such as the object identity). The hash may contain no information as to the state of an object, i.e. the hash may be stateless. The load balancers $204_1$, $204_2$, $204_3$, $204_n$ select a new message processing node $202_1$, $202_2$, $202_n$ to be the responsible message processing node based on the hash. The load balancers $204_1$, $204_2$, $204_3$, $204_n$ use a hashing algorithm that will minimise the changes to the responsible message processing nodes when scaling of the load is required. For example, the load balancers $204_1$, $204_2$, $204_3$, $204_n$ may use hashing algorithms such as consistent hashing, rendezvous hashing, or any other hashing algorithm.

If scaling of the load is not required and there is no failure of the message processing nodes $202_1$, $202_2$, $202_n$, the load balancers $204_1$, $204_2$, $204_3$, $204_n$ are operable to send subsequent messages for a transaction to the same message processing nodes $202_1$, $202_2$, $202_n$ that received the first message for that transaction. The message processing nodes $202_1$, $202_2$, $202_n$ then locally store or maintain information that identifies the current state associated with the object during the transaction (i.e. the intra-transaction state) for ongoing messages between message processing nodes. In other words, the message processing nodes $202_1$, $202_2$, $202_n$ keep the state for the object during the transaction.

In this way, the same message processing node $202_1$, $202_2$, $202_n$ handles both the transaction and the state for the object to which that transaction refers. This is useful, for example, where multiple transactions are initiated for the same object in an asynchronous manner. The transactions can be intelligently ordered, merged or handled jointly in another way and this joint handling can be simplified by the same message processing node $202_1$, $202_2$, $202_n$ handling both the transaction and the corresponding state of the object to which the transaction refers.

Figure 4:
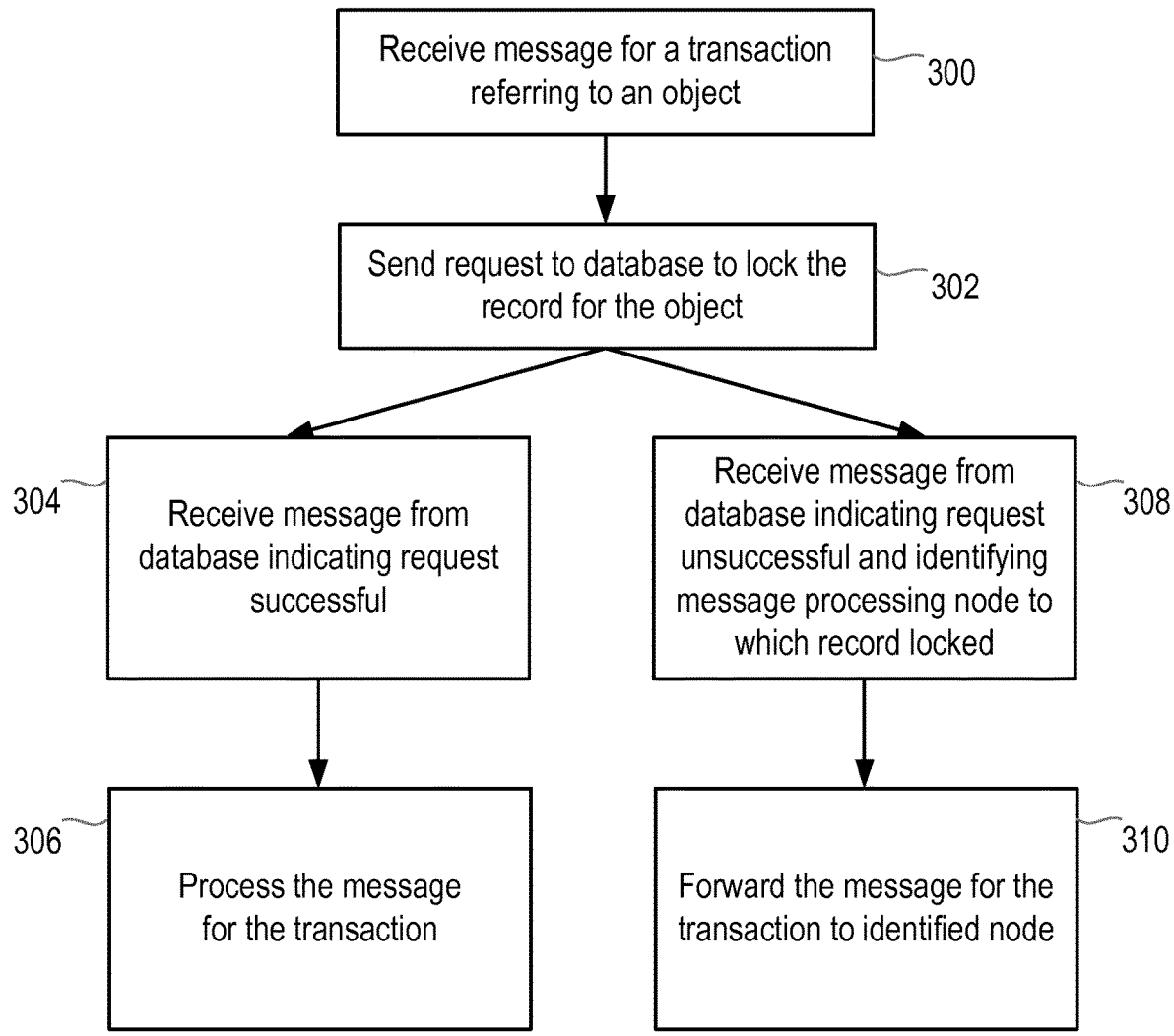
FIG. 4 is a flow chart illustrating a process performed by a message processing node in accordance with the invention.

FIG. 4 illustrates a method for operating a message processing node $202_1$, $202_2$, $202_n$ in accordance with an embodiment of the invention.

Figure 5:
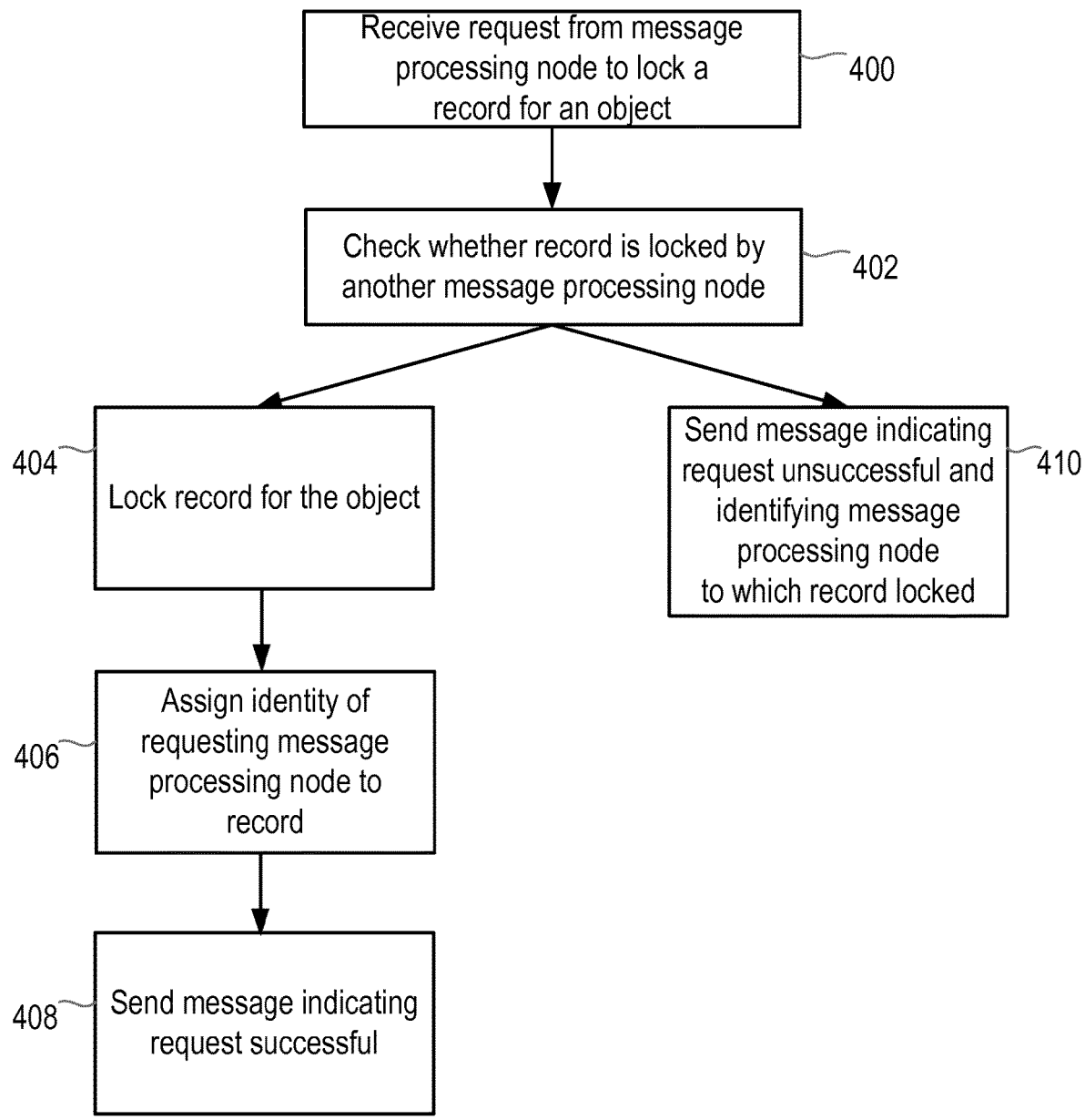
FIG. 5 is a flow chart illustrating a process performed by a database in accordance with the invention.

FIG. 5 illustrates a method for operating a database 206 in accordance with an embodiment of the invention.

Figure 6A:
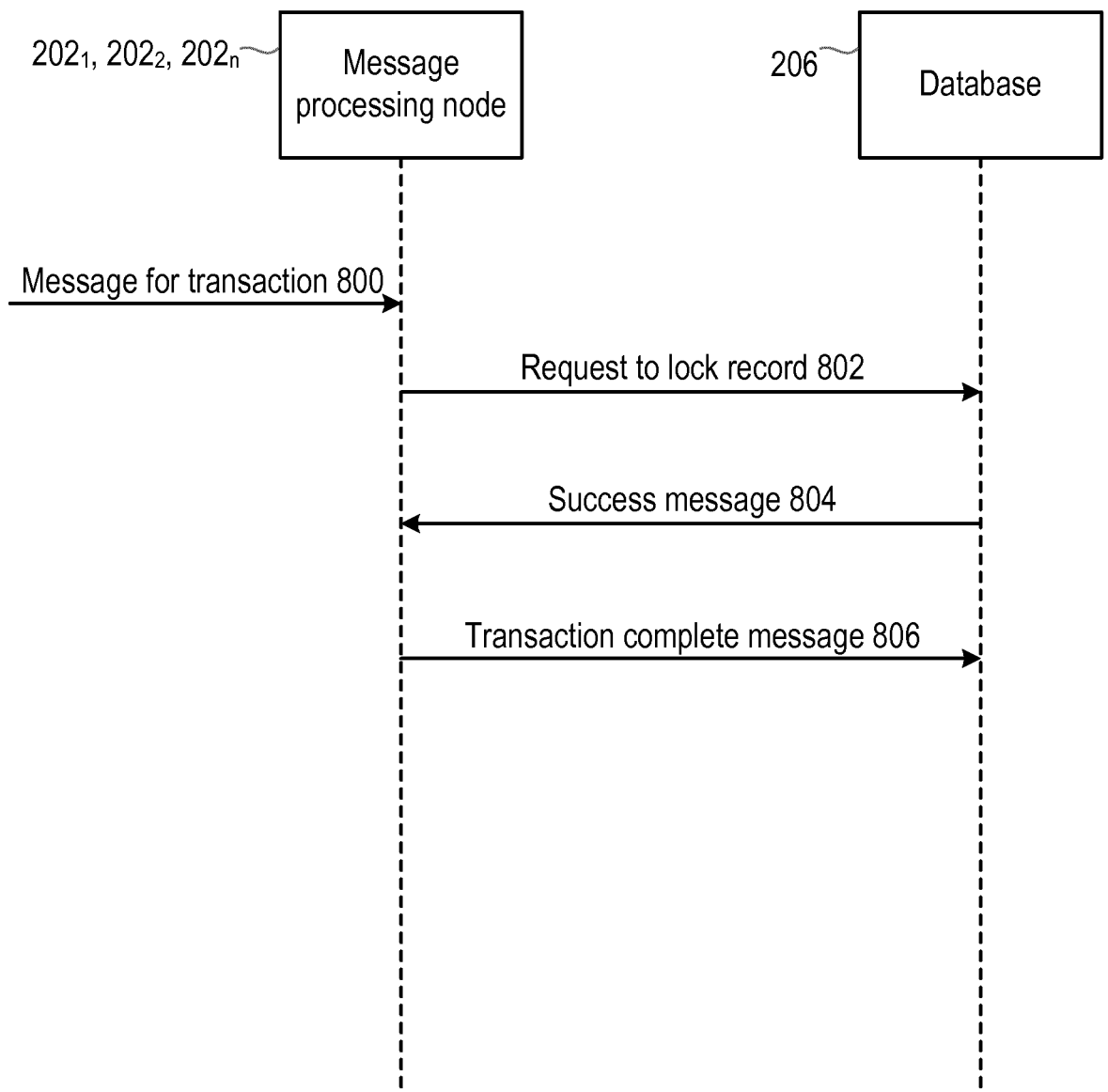
FIGS. 6A and 6B illustrate signalling diagrams of the signals between the message processing node and the database in accordance the invention.
Figure 6B:
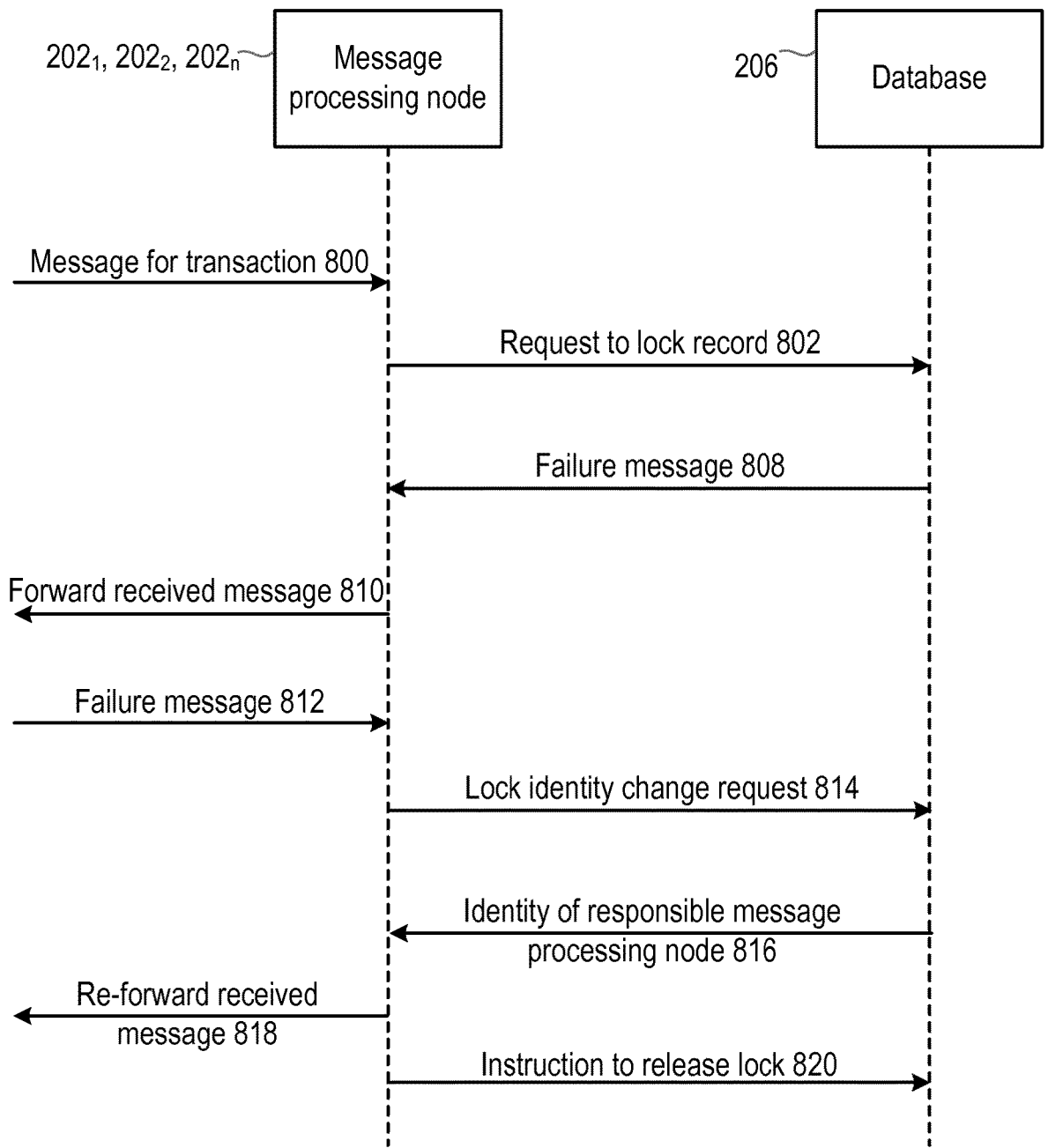

FIGS. 6A and 6B illustrate signalling diagrams of the signals between the message processing node $202_1$, $202_2$, $202_n$ and the database 206 in accordance the invention.

A method performed in the message processing system within the message processing node $202_1$, $202_2$, $202_n$ and the database 206 respectively will now be described with reference to FIGS. 4, 5 and 6.

With reference to FIG. 4, at block 300, the communications interface 104 of the message processing node $202_1$, $202_2$, $202_n$ receives a message (signal 800 of FIGS. 6A and 6B) for a transaction referring to an object for which a record is stored in the database 206 of the message processing system 200. The storage unit 102A of the database is operable to store a record for a plurality of objects. The received message may be an initial (i.e. opening) message for a transaction referring to an object or a subsequent message for a transaction.

Optionally, upon receipt of the message for the transaction referring to the object for which a record is stored in a database 206, the processing unit 106 determines whether the message processing node $202_1$, $202_2$, $202_n$ is responsible for processing the transaction for the object.

Where it is determined that the message processing node $202_1$, $202_2$, $202_n$ is responsible for processing the transaction for the object, the method proceeds straight to block 306. At block 306, the processing unit 106 of the processing node $202_1$, $202_2$, $202_n$ processes the received message. In this case, the record for the object stored in the database 206 is already locked by the message processing node $202_1$, $202_2$, $202_n$. For example, this may be the case where the received message is the first message of a new, asynchronously started, transaction or where the received message is a subsequent message of an already ongoing transaction for which the message processing node $202_1$, $202_2$, $202_n$ is already processing. The processing unit 106 may access the record for the object in the database to process the received message. For example, the received message may require the processing unit 106 to retrieve or read data for the object, write data for the object, etc.

Where it is determined that the message processing node $202_1$, $202_2$, $202_n$ is not responsible for processing the transaction for the object, the processing unit 106 of the processing node $202_1$, $202_2$, $202_n$, the method proceeds to block 302 of FIG. 4.

Alternatively, the processing unit 106 does not make a determination of whether the message processing node $202_1$, $202_2$, $202_n$ is responsible for processing the transaction for the object and the method simply proceeds straight to block 302 of FIG. 4 upon receipt of the message for the transaction referring to the object for which a record is stored in a database 206.

At block 302 of FIG. 4, upon receipt of the message for the transaction referring to the object for which a record is stored in the database 206, the communications interface 104 of the message processing node $202_1$, $202_2$, $202_n$ sends a request (signal 802 of FIGS. 6A and 6B) to the database 206 to lock the record for the object. In other words, the message processing node $202_1$, $202_2$, $202_n$ attempts to create a lock on the record for the object, which marks itself as the owner of that record. The lock prevents other message processing nodes from accessing the record for the object while a transaction on the object is in progress. The message processing node $202_1$, $202_2$, $202_n$ also access the database 206 to read relevant data for the object of the transaction.

With reference to FIG. 5, at block 400, the communications interface 104A of the database 206 receives from the message processing node $202_1$, $202_2$, $202_n$ the request to lock the record for the object. Then, at block 402, the processing unit 106A of the database 206 checks whether the record for the object is locked by another message processing node.

Where the record for the object is locked by the same message processing entity making the request, the method proceeds straight to block 408 where the communications interface 104A of the database 206 sends a message (signal 804 of FIG. 6) to the message processing node $202_1$, $202_2$, $202_n$ indicating that the request to lock the record for the object is successful.

Where the record for the object is unlocked, the method of operating the database 206 instead proceeds to block 404. At block 404, the processing unit 106A of the database 206 locks the record for the object. Then, at block 406, the processing unit 106A of the database 206 assigns the identity of the message processing node $202_1$, $202_2$, $202_n$ to the record. In other words, the processing unit 106A of the database 206 marks the lock with the identity of the message processing node $202_1$, $202_2$, $202_n$. The processing unit 106A of the database 206 locks the record for the object until the transaction referring to the object for which the record is stored is complete. The processing unit 106A of the database 206 also stores the owner (i.e. the identity of the message processing node) of the lock until the transaction referring to the object for which the record is stored is complete.

At block 408, the communications interface 104A of the database 206 sends a message (signal 804 of FIG. 6) to the message processing node $202_1$, $202_2$, $202_n$ indicating that the request to lock the record for the object is successful. In this way, the message processing node $202_1$, $202_2$, $202_n$ can retrieve state information for the object. For example, if the request is successful (since the record for the object is unlocked), the message processing node $202_1$, $202_2$, $202_n$ has knowledge that the transaction is not already being handled by another message processing node. In this case, the received message for the transaction referring to the object may be an initial (i.e. opening) message for the transaction. Similarly, if the request is unsuccessful (since the record for the object has been locked by another message processing node), the message processing node $202_1$, $202_2$, $202_n$ has knowledge that the transaction is already being handled by another message processing node. In this case, the received message for the transaction referring to the object may be a subsequent message for the transaction. Otherwise, the message processing node $202_1$, $202_2$, $202_n$ may have no knowledge of prior events for the object. The message processing node $202_1$, $202_2$, $202_n$ attempts to lock the record for the object irrespective of whether the record is already locked or is unlocked since the message processing node $202_1$, $202_2$, $202_n$ does not hold this information.

With reference to FIG. 4, where the record for the object is unlocked, the method of operating the message processing node $202_1$, $202_2$, $202_n$ proceeds to block 304. At block 304, the communications interface 104 of the message processing node $202_1$, $202_2$, $202_n$ receives the message (signal 804 of FIG. 6) from the database 206 indicating that the request to lock the record for the object is successful.

At block 306, the processing unit 106 of the message processing node $202_1$, $202_2$, $202_n$ processes the received message for the transaction referring to the object. The load balancers $204_1$, $204_2$, $204_3$, $204_n$ of the message processing system 200 direct subsequent messages for the transaction to this same message processing node $202_1$, $202_2$, $202_n$ and the processing unit 106 of the message processing node $202_1$, $202_2$, $202_n$ processes the subsequent messages for the transaction. The processing unit 106 of the message processing node $202_1$, $202_2$, $202_n$ processes messages for the transaction until the transaction is complete. The processing unit 106 of the processing node $202_1$, $202_2$, $202_n$ determines that a transaction is complete by any appropriate method (for example, based on state, timers, incoming messages or any other external input).

Upon completion of the transaction referring to the object, the communications interface 104 of the message processing node $202_1$, $202_2$, $202_n$ sends a message (signal 806 of FIG. 6) to the database 206 indicating the transaction referring to the object is complete. The communications interface 104A of the database 206 receives the message from the message processing node $202_1$, $202_2$, $202_n$ indicating the transaction referring to the object is complete and, in response to receiving the message, the processing unit 106A of the database 206 unlocks the record for the object.

In one embodiment, the storage unit 102 of the message processing node $202_1$, $202_2$, $202_n$ stores the received message (and subsequent messages) for the transaction referring to the object until the transaction referring to the object is complete. Once the transaction referring to the object is complete, the processing unit 106 of the message processing node $202_1$, $202_2$, $202_n$ removes the received message (and subsequent messages) for the transaction referring to the object from the storage unit 102 of the message processing node $202_1$, $202_2$, $202_n$.

With reference to FIG. 5, where the record for the object is locked by another message processing node at block 402, the method of operating the database 206 instead proceeds to block 410. This may occur, for example, where there has been a change in responsibility for the object (e.g. due to a scaling event) and the received message for the transaction referring to the object is a subsequent message of the transaction (or the first message of an asynchronously started parallel transaction to the same object), which has been sent to a different message processing node. At block 410, the communications interface 104A of the database 206 sends a message (signal 808 of FIG. 6B) to the message processing node $202_1$, $202_2$, $202_n$ indicating that the request to lock the record for the object is unsuccessful (i.e. returns a message indicating a lock failure) and identifying the message processing node to which the record for the object is locked (i.e. identifying the owner of the lock).

With reference to FIG. 4, where the record for the object has been locked previously by another message processing node, the method of operating the message processing node $202_1$, $202_2$, $202_n$ instead proceeds to block 308. At block 308, the communications interface 104 of the message processing node $202_1$, $202_2$, $202_n$ receives the message (signal 808 of FIG. 6B) from the database 206 indicating that the request to lock the record for the object is unsuccessful and identifying the message processing node to which the record for the object is locked.

This may occur, for example, where a load scaling event has been initiated during the transaction to which the message initially received by the message processing node $202_1$, $202_2$, $202_n$ relates. Specifically, during a load scaling event, the message processing node $202_1$, $202_2$, $202_n$ may receive a subsequent message for a transaction in respect of which another message processing node $202_1$, $202_2$, $202_n$ was already responsible before the load scaling event. In other words, the message is received by the wrong message processing node $202_1$, $202_2$, $202_n$. As the communications interface 104 of the message processing node $202_1$, $202_2$, $202_n$ receives the message from the database 206 identifying the message processing node to which the record for the object is locked, the message processing node $202_1$, $202_2$, $202_n$ is aware of the message processing node $202_1$, $202_2$, $202_n$ that owns the lock and that is already processing the transaction and can thus forward the received message to the responsible message processing node.

Thus, at block 310, the processing unit 106 of the message processing node $202_1$, $202_2$, $202_n$ forwards the received message (signal 810 of FIG. 6B) for the transaction referring to the object to the identified message processing node. A similar forwarding can take place for asynchronously started transactions for the same object.

In one embodiment, the processing unit 106 of the message processing node $202_1$, $202_2$, $202_n$ determines whether forwarding the received message for the transaction referring to the object is successful. The processing unit 106 of the message processing node $202_1$, $202_2$, $202_n$ may make this determination based on a message (signal 812 of FIG. 6B) received from the identified message processing node via the communications interface 104 of the message processing node $202_1$, $202_2$, $202_n$ that indicates whether forwarding the received message has been successful.

For example, the message received from the identified message processing node via the communications interface 104 of the message processing node $202_1$, $202_2$, $202_n$ may be a safe receipt acknowledgment message where forwarding has been successful or a failure message where forwarding has been unsuccessful. In another example, the processing unit 106 of the message processing node $202_1$, $202_2$, $202_n$ determines that forwarding has been unsuccessful where no message is received from the identified message processing node. The message processing node $202_1$, $202_2$, $202_n$ can further verify that forwarding has failed by consulting a system manager or another node overseeing the message processing system 200.

In response to determining that forwarding the received message for the transaction referring to the object is successful, the processing unit 106 of the message processing node $202_1$, $202_2$, $202_n$ removes from the storage unit 102 of the message processing node $202_1$, $202_2$, $202_n$ the received message (and any subsequent messages) for the transaction referring to the object that are stored in the storage unit 102. In other words, the message processing node $202_1$, $202_2$, $202_n$ forgets about the received message (and any subsequent messages) for the transaction referring to the object after verifying safe reception by the identified message processing node.

The communications interface 104 of the message processing node $202_1$, $202_2$, $202_n$ may continue to receive messages for the transaction referring to the object and the processing unit 106 will then keep attempting to lock the record for the object in the database 206 by sending a request via the communications interface 104. Each time an attempt to lock the record for the object fails, the processing unit 106 of the message processing node $202_1$, $202_2$, $202_n$ forwards the message of the transaction to the identified message processing node.

Once the transaction is complete, the identified message processing node updates the record for the objection in the database 206 and instructs the database 206 to release the lock. From then on, if the communications interface 104 of the message processing node $202_1$, $202_2$, $202_n$ receives a first message of a new transaction for the object, an attempt to lock the record for the object by the message processing node $202_1$, $202_2$, $202_n$ will succeed and the message processing node $202_1$, $202_2$, $202_n$ will become the responsible message processing node. The identified message processing node is then no longer involved at this stage.

On the other hand, in response to determining that forwarding the received message for the transaction referring to the object is unsuccessful, the processing unit 106 of the message processing node $202_1$, $202_2$, $202_n$ sends a request (signal 814 of FIG. 6B) to the database 206 requesting that the identity of the message processing node to which the record for the object is locked is changed to the identity of the message processing node (i.e. to change the owner of the record lock to itself). In other words, the message processing node $202_1$, $202_2$, $202_n$ attempts to take over responsibility for the transaction on the object.

This may occur, for example, where the message processing node to which the record for the object is locked (i.e. the message processing node that is responsible for the transaction) has failed during the transaction. Where the message processing node to which the record for the object is locked has failed, the communications interface 104 of the message processing node $202_1$, $202_2$, $202_n$ may receive subsequent messages for the transaction in respect of which the previously received message was forwarded. The processing unit 106 of the message processing node $202_1$, $202_2$, 202 may then determine that forwarding the received message for the transaction referring to the object has failed (for example, due to the message processing node to which the received message was forwarded having failed or crashed). In this way, the processing unit 106 of the message processing node $202_1$, $202_2$, 202 can be made aware of the failure to send the request to the database 206 to change the identity of the owner of the lock to itself.

When the processing unit 106 of the message processing node $202_1$, $202_2$, $202_n$ attempts to take ownership of the lock, it provides to the database 206 the identity of the previous owner of the lock.

The communications interface 104A of the database 206 receives the request (signal 814 of FIG. 6B) from the message processing node $202_1$, $202_2$, $202_n$ requesting that the identity of the message processing node to which the record for the object is locked is changed to the identity of the message processing node $202_1$, $202_2$, $202_n$ and determines whether to allow the request. In one example, the request to the database 206 to change the identity is unsuccessful (and the request rejected by the database 206) where the processing unit 106 of the message processing node $202_1$, $202_2$, $202_n$ has provided an identity of the previous owner of the lock to the database 206 which is no longer the owner of the lock (for example, another message processing node may have taken over ownership of the lock). In this case, the communications interface 104A of the database 206 returns the identity (signal 816 of FIG. 6B) of the message processing node that is currently responsible for the lock.

Where the request to the database 206 to change the identity of the message processing node to which the record for the object is locked to the identity of the message processing node is successful, the processing unit 106 of the message processing node $202_1$, $202_2$, $202_n$ processes the message relating to the object (and subsequent messages) for the transaction referring to the object until the transaction referring to the object is complete. The message processing node $202_1$, $202_2$, $202_n$ is then able to request data regarding the object from the database 206 and process incoming message referring to the object.

On the other hand, where the request to the database 206 to change the identity of the message processing node to which the record for the object is locked to the identity of the message processing node is unsuccessful, the processing unit 106 of the message processing node $202_1$, $202_2$, $202_n$ re-forwards the received message (signal 818 of FIG. 6B) for the transaction referring to the object to the message processing node identified in the message received from the database 206 as the message processing node to which the record for the object is locked 206.

In response to determining that re-forwarding the received message for the transaction referring to the object is unsuccessful, the processing unit 106 of the message processing node $202_1$, $202_2$, $202_n$ rejects the transaction and instructs the database 206 (signal 820 of FIG. 6B) to release the lock on the record for the object referred to in the received message for the transaction. The rejection of the transaction by the processing unit 106 of the message processing node $202_1$, $202_2$, $202_n$ triggers the transaction to be re-tried (i.e. re-attempted). Then, when the transaction is re-tried and an initial message for the transaction is received by a message processing node $202_1$, $202_2$, $202_n$, the message processing node $202_1$, $202_2$, $202_n$ will be able to lock the record for the object referred to in the message and thus process the transaction since the previous lock on that record for the object is released.

Figure 7:
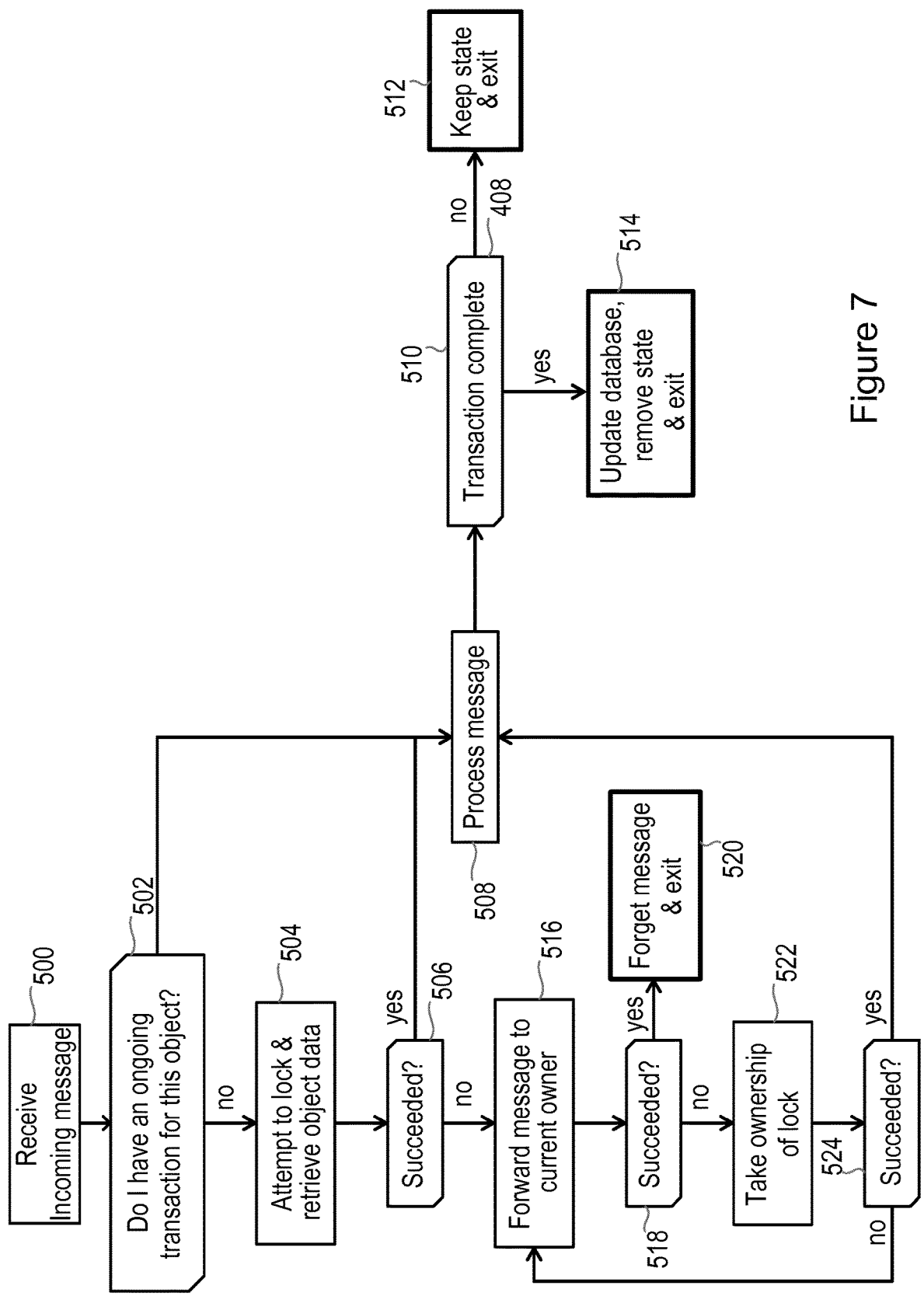
FIG. 7 is a flow chart illustrating a process performed by a message processing node in accordance with an embodiment of the invention.

FIG. 7 illustrates a flow chart of a process performed by a message processing node in accordance with an embodiment of the invention, which will now be described.

At block 500, the communications interface 104 of the message processing node $202_1$, $202_2$, $202_n$ receives an incoming message. The incoming message is a message for a transaction referring to an object for which a record is stored in the database 206 of the message processing system 200.

At block 502, the processing unit 106 of the message processing node $202_1$, $202_2$, $202_n$ checks whether it has an ongoing transaction for the object to which the transaction refers. If the processing unit 106 of the message processing node $202_1$, $202_2$, $202_n$ determines that it has an ongoing transaction for the object, the method proceeds to block 508 at which the processing unit 106 of the message processing node $202_1$, $202_2$, $202_n$ processes the received message for the transaction referring to the object.

As shown at block 510, the processing unit 106 of the message processing node $202_1$, $202_2$, $202_n$ processes the received message for the transaction referring to the object (and subsequent messages for the transaction referring to the object) until the transaction referring to the object is complete.

During the processing unit 106 of the message processing node $202_1$, $202_2$, $202_n$ processing the received message for the transaction (and subsequent messages for the transaction referring to the object), at block 512, the processing unit 106 of the message processing node $202_1$, $202_2$, $202_n$ stores or maintains information associated with the object state in the storage unit 102 of the message processing node $202_1$, $202_2$, $202_n$. For example, the processing unit 106 of the message processing node $202_1$, $202_2$, $202_n$ stores or maintains the received message and any subsequent messages for the transaction referring to the object in the storage unit 102 of the message processing node $202_1$, $202_2$, $202_n$. The processing unit 106 of the message processing node $202_1$, $202_2$, $202_n$ stores or maintains information associated with the object state in the storage unit 102 of the message processing node $202_1$, $202_2$, $202_n$ until the transaction referring to the object is complete.

Once the processing unit 106 of the message processing node $202_1$, $202_2$, $202_n$ determines that the transaction referring to the object is complete at block 510, method proceeds to block 514. At block 514, the processing unit 106 of the message processing node $202_1$, $202_2$, $202_n$ updates the storage unit 102 of the message processing node $202_1$, $202_2$, $202_n$ and removes the stored information associated with the object state.

If, at block 502, the processing unit 106 of the message processing node $202_1$, $202_2$, $202_n$ determines that it does not have an ongoing transaction for the object, the method proceeds to block 504 at which the processing unit 106 of the message processing node $202_1$, $202_2$, $202_n$ attempts to lock the record for the object to which the received message for the transaction refers and retrieve object data from the record. In particular, at block 504, the communications interface 104 of the message processing node $202_1$, $202_2$, $202_n$ sends a request to the database 206 to lock the record for the object.

At block 506, the processing unit 106 of the message processing node $202_1$, $202_2$, $202_n$ determines whether the attempt to lock the record for the object to which the received message for the transaction refers has succeeded. In particular, at block 506, the communications interface 104 of the message processing node $202_1$, $202_2$, $202_n$ receives a message from the database 206 indicating whether the request to lock the record for the object is successful.

If, at block 506, the processing unit 106 of the message processing node $202_1$, $202_2$, $202_n$ determines that the request to lock the record for the object is successful, the method proceeds to block 508 at which the processing unit 106 of the message processing node $202_1$, $202_2$, $202_n$ processes the received message for the transaction referring to the object. The method then proceeds to blocks 510, 512 and 514 in the manner described earlier.

If, on the other hand, at block 506 the processing unit 106 of the message processing node $202_1$, $202_2$, $202_n$ determines that the request to lock the record for the object is unsuccessful, the method proceeds to block 516. At block 516, the processing unit 106 of the message processing node $202_1$, $202_2$, $202_n$ forwards the received message for the transaction referring to the object to the identified message processing node. The message received by the communications interface 104 of the message processing node $202_1$, $202_2$, $202_n$ from the database 206 indicating that the request to lock the record for the object is unsuccessful also identifies the message processing node to which the record for the object is locked such that the processing unit 106 of the message processing node $202_1$, $202_2$, $202_n$ is able to forward the received message for the transaction referring to the object to the identified message processing node at block 516.

At block 518, the processing unit 106 of the message processing node $202_1$, $202_2$, $202_n$ determines whether forwarding the received message for the transaction referring to the object is successful.

In response to determining at block 518 that forwarding the received message for the transaction referring to the object is successful, the method of operating the message processing node $202_1$, $202_2$, $202_n$ proceeds to block 520. At block 520, the processing unit 106 of the message processing node $202_1$, $202_2$, $202_n$ removes the received message (and any subsequent messages) for the transaction referring to the object that are stored in the storage unit 102 of the message processing node $202_1$, $202_2$, $202_n$. In effect, the message processing node $202_1$, $202_2$, $202_n$ forgets the messages.

On the other hand, in response to determining at block 518 that forwarding the received message for the transaction referring to the object is unsuccessful, the method of operating the message processing node $202_1$, $202_2$, $202_n$ proceeds to block 522. At block 522, the communications interface 104 of the message processing node $202_1$, $202_2$, $202_n$ sends a request to the database 206 requesting that the identity of the message processing node to which the record for the object is locked is changed to the identity of the message processing node. In other words, at block 522, the communications interface 104 of the message processing node $202_1$, $202_2$, $202_n$ sends a request to the database 206 requesting for the message processing node $202_1$, $202_2$, $202_n$ to take ownership of the lock.

At block 524, the processing unit 106 of the message processing node $202_1$, $202_2$, $202_n$ determines whether the request to change the identity of the message processing node to which the record for the object is locked to the identity of the message processing node is successful. In other words, at block 522, the processing unit 106 of the message processing node $202_1$, $202_2$, $202_n$ determines whether the request to take ownership of the lock is successful. For example, at block 506, the communications interface 104 of the message processing node $202_1$, $202_2$, $202_n$ receives a message from the database 206 indicating whether the request to take ownership of the lock is successful.

If, at block 524, the processing unit 106 of the message processing node $202_1$, $202_2$, $202_n$ determines that the request to take ownership of the lock is successful, the method proceeds to block 508 at which the processing unit 106 of the message processing node $202_1$, $202_2$, $202_n$ processes the received message for the transaction referring to the object. The method then proceeds to blocks 510, 512 and 514 in the manner described earlier.

If, on the other hand, at block 524 the processing unit 106 of the message processing node $202_1$, $202_2$, $202_n$ determines that the request to take ownership of the lock is unsuccessful, the method proceeds to block 516 at which the processing unit 106 of the message processing node $202_1$, $202_2$, $202_n$ re-forwards the received message for the transaction referring to the object to the message processing node identified in the message received from the database 206 as the message processing node to which the record for the object is locked. The method of operating the message processing node $202_1$, $202_2$, $202_n$ then proceeds to block 518 and follows the process described earlier.

Figure 8:
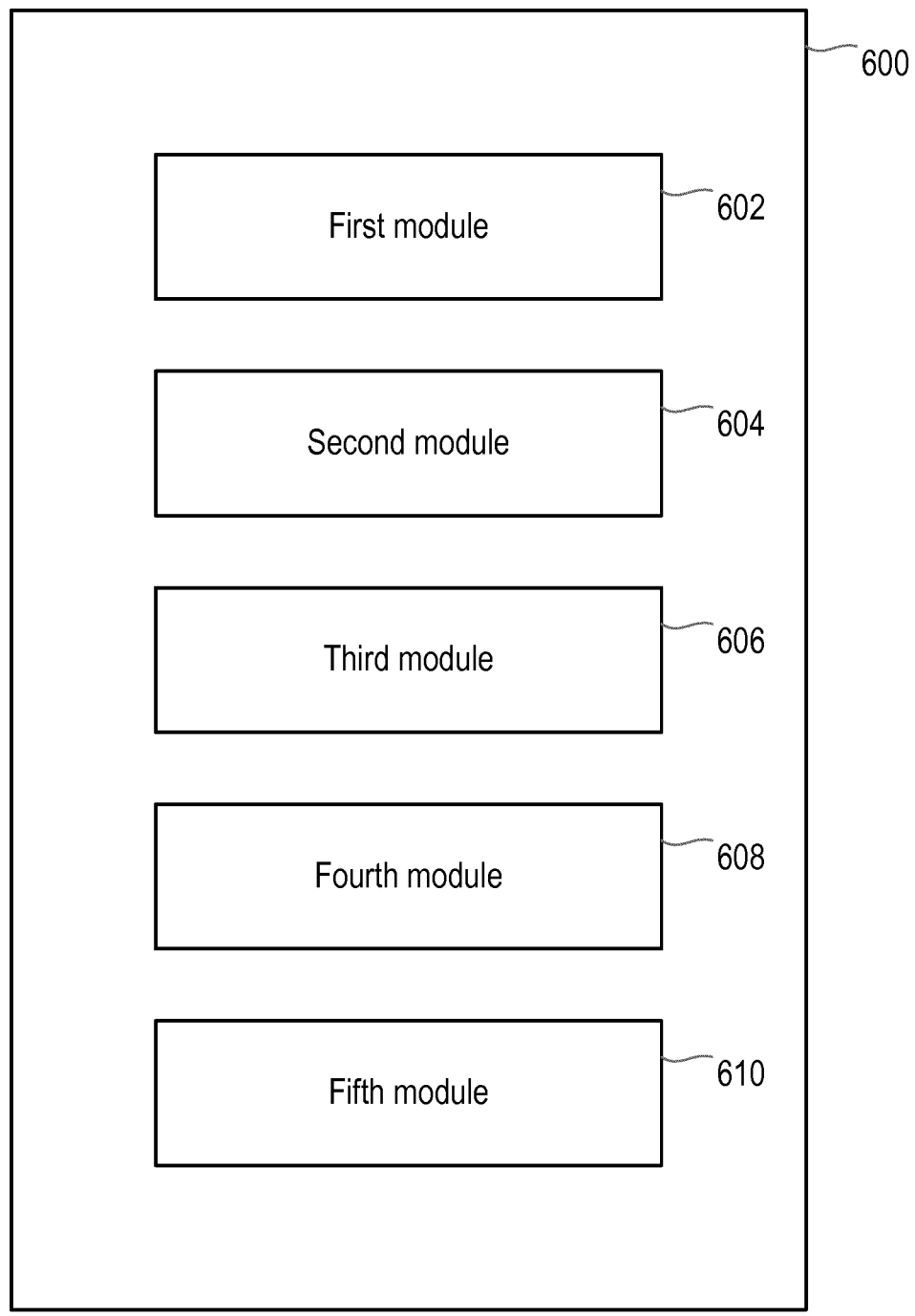
FIG. 8 is a block diagram illustrating a message processing node for use in a message processing system in accordance with an embodiment of the invention.

FIG. 8 is a block diagram illustrating a message processing node 600 for use in a message processing system in accordance with another embodiment of the invention.

With reference to FIG. 8, the message processing node 600 comprises a first module 602 configured to, upon receipt of a message for a transaction referring to an object for which a record is stored in a database 206, 700 send a request to the database 206, 700 to lock the record for the object. The message processing node 600 also comprises a second module 604 and a third module 606. Where the record for the object is unlocked, the second module 604 is configured to receive a message from the database 206, 700 indicating that the request to lock the record for the object is successful and the third module 606 is configured to process the received message for the transaction referring to the object. The message processing node 600 also comprises a fourth module 608 and a fifth module 610. Where the record for the object is locked by another message processing node, the fourth module 608 is configured to receive a message from the database 206, 700 indicating that the request to lock the record for the object is unsuccessful and identifying the message processing node to which the record for the object is locked, and the fifth module 610 is configured to forward the received message for the transaction referring to the object to the identified message processing node.

Figure 9:
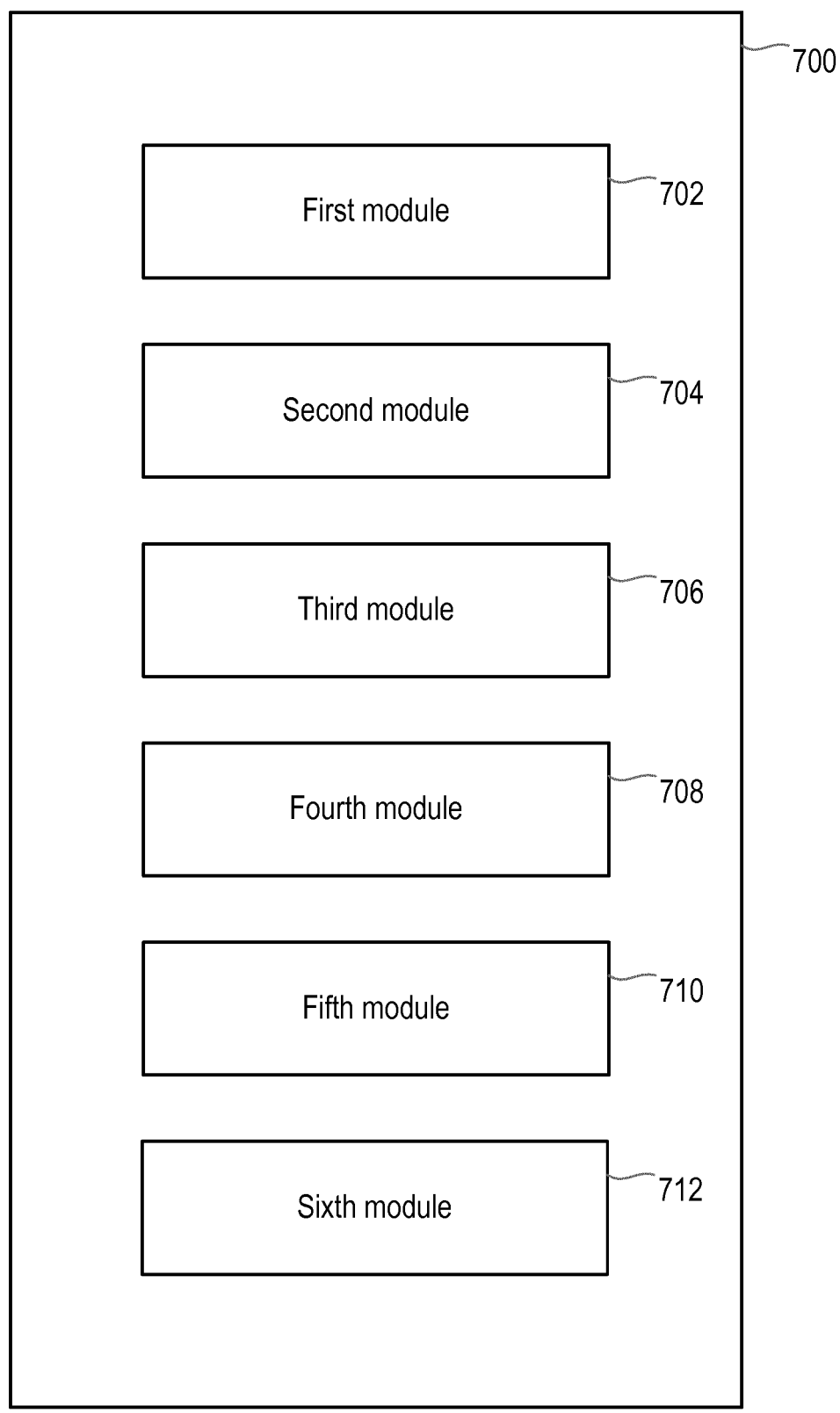
FIG. 9 is a block diagram illustrating a database for use in a message processing system in accordance with an embodiment of the invention.

FIG. 9 is a block diagram illustrating a database 700 for use in a message processing system in accordance with another embodiment of the invention.

With reference to FIG. 9, the database 700 comprises a first module 702 configured to store a record for a plurality of objects and a second module 704 configured to receive from a message processing node $202_1$, $202_2$, $202_n$, 600 a request to lock a record for an object. The database 700 also comprises a third module 706 configured to check whether the record for the object is locked by another message processing node. The database 700 comprises a fourth module 708 and, where the record for the object is locked by another message processing node, the fourth module 708 is configured to send a message to the message processing node $202_1$, $202_2$, $202_n$, 600 indicating that the request to lock the record for the object is unsuccessful and identifying the message processing node to which the record for the object is locked. The database 700 also comprises a fifth module 710 and a sixth module 712. Where the record for the object is unlocked, the fifth module 710 is configured to lock the record for the object and assign the identity of the message processing node $202_1$, $202_2$, $202_n$, 600 to the record and the sixth module 712 is configured to send a message to the message processing node $202_1$, $202_2$, $202_n$, 600 indicating that the request to lock the record for the object is successful.

According to the invention, there is also provided a computer program product comprising a carrier containing instructions for causing a processor to perform at least part of the method described herein.

There is thus advantageously provided a message processing node $202_1$, $202_2$, $202_n$, 600 and database 206, 700 for use in a message processing system and a method for operating the message processing node $202_1$, $202_2$, $202_n$, 600 and database 206, 700 that enables a near-stateless processing model for complex transactions, which is capable of providing scaling and failover support to the message processing system 200. The near-stateless message processing nodes $202_1$, $202_2$, $202_n$, 600 use the database 206, 700 to serve transactions on object records stored in the database 206, 700. Advantageously, the message processing nodes $202_1$, $202_2$, $202_n$, 600 need only store or maintain the intra-transaction state. The necessity to transfer or continuously store intra-transaction state information in the message processing system is eliminated since a message processing node need only hold transaction state information during a transaction. It is possible to achieve stateless load-balancing, whilst still progressing transactions at a single message processing node $202_1$, $202_2$, $202_n$, 600, without intra-transaction state relocation even where there are multiple asynchronous transactions or where scaling and/or failure events occur. In this way, the load on the system is lowered, processing times are faster and there is no delay in load balancing or loss of data where a message processing node has failed.

Moreover, the present invention advantageously enables a message processing node to become aware where a received message that it has forwarded to a responsible message processing node has not been forwarded successfully (and thus processed successfully) and can attempt to take control of the record for the object to process the message for the transaction itself. That way, even if the previously responsible message processing node fails, the received message will not be lost and attempts can be made to process the message in order to complete the transaction or even begin a new transaction on the object for which the record is locked in the database. According to the invention, a message processing node can advantageously take over from another message processing node in order to continue processing messages for transactions and thus complete the transactions, even in situations where the previous message processing node has failed. In this way, the message processing node continues to make attempts for the received message to be successfully processed.

Also, the present invention advantageously increases the storage space available in the message processing node and also reduces the overall load on the system and reduces processing times since the message processing node only holds transaction state information during a transaction. In this way, the message processing node is able to take immediate control to process the message without delay.

According to the invention, it is an advantage that each message will be processed to ensure that a transaction is completed and no data is lost. Advantageously, a message processing node has the information available regarding the state of the transaction during the transaction itself, which enables the message processing node to maintain smooth and uninterrupted processing of messages until completion of the transaction. The information may also be useful should the message processing node fail and it is only kept until the transaction is complete such that it does not take up unnecessary memory space.

The database according to the invention is advantageously provided with immediate confirmation that the lock on the entry for the object is no longer necessary since the transaction has successfully completed. In this way, the database has the ability to allow another message processing node to take over responsibility for a transaction, which is particularly useful in a case where the previously responsible message processing node has failed or has been reassigned due to a redistribution of the load in the system.

An advantage is that the transactions in the message processing system of the invention can be completed as efficiently and securely as possible since only the message processing node that is currently processing the transaction will be able to access the record for the object while the transaction is still ongoing. The record for the object is only inaccessible to other message processing nodes during a transaction. Where there is no transaction on the object in progress, the record for the object is released such that any message processing node is again able to access the record for the object. This advantageously provides a more efficient and secure message processing system.

Therefore, the invention advantageously provides an improved means for processing messages of transactions for objects in a message processing system.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a message processing node in a message processing system, the method comprising:
   upon receipt of a message for a transaction referring to an object for which a record is stored in a database, sending a request to the database to lock the record for the object; and where the record for the object is unlocked:
  receiving a message from the database indicating that the request to lock the record for the object is successful; and
  processing the received message for the transaction;
where the record for the object has been locked previously by another message processing node:
  receiving a message from the database, wherein the message indicates that the request to lock the record for the object is unsuccessful and identifies the message processing node to which the record for the object is locked; and
  forwarding the received message for the transaction referring to the object to the identified message processing node;
  determining whether forwarding the received message for the transaction referring to the object is successful; and,
  in response to determining that forwarding the received message for the transaction referring to the object is unsuccessful, sending a request to the database requesting that the identity of the message processing node to which the record for the object is locked be changed to the identity of the message processing node sending the request.

2. The method of claim 1, wherein the request to the database to change the identity of the message processing node to which the record for the object is locked to the identity of the message processing node is successful and the method further comprises:
  processing the message relating to the object and subsequent messages for the transaction referring to the object by the message processing node until the transaction referring to the object is complete.

3. The method of claim 1, wherein the request to the database to change the identity of the message processing node to which the record for the object is locked to the identity of the message processing node is unsuccessful and the method further comprises:
  re-forwarding the received message for the transaction referring to the object to the message processing node identified in the message received from the database as the message processing node to which the record for the object is locked.

4. The method of claim 1, further comprising:
in response to determining that forwarding the received message for the transaction referring to the object is successful, removing the received message and subsequent messages for the transaction referring to the object stored in a storage unit of the message processing node from the storage unit.

5. The method of claim 1, further comprising:
upon receipt of a message for a transaction referring to an object for which a record is stored in a database, determining whether the message processing node is responsible for processing the transaction; and
where the message processing node is responsible for processing the transaction, processing the received message for the transaction.

6. The method of claim 1, wherein processing the received message relating to the object comprises:
processing the received message and subsequent messages for the transaction referring to the object until the transaction referring to the object is complete.

7. The method of claim 1, further comprising:
storing the received message and subsequent messages for the transaction referring to the object in a storage unit of the message processing node until the transaction referring to the object is complete.

8. The method of claim 1, further comprising:
upon completion of the transaction referring to the object:
sending a message to the database indicating the transaction referring to the object is complete.

9. A method of operating a database in a message processing system, the method comprising:
receiving from a message processing node a request to lock a record for an object; and
checking whether the record for the object is locked by another message processing node;
where the record for the object is locked by another message processing node:
  sending a message to the message processing node, wherein the message indicates that the request to lock the record for the object is unsuccessful and identifies the message processing node to which the record for the object is locked; and
  receiving a request from the message processing node requesting that the identity of the message processing node to which the record for the object is locked is changed to the identity of the message processing node from which the request is received and determining whether to allow the request;
where the record for the object is unlocked:
  locking the record for the object;
  assigning the identity of the message processing node to the record; and
  sending a message to the message processing node indicating that the request to lock the record for the object is successful.

10. The method of claim 9, wherein the record for the object is locked until the transaction is complete.

11. The method of claim 9, further comprising:
receiving a message from the message processing node indicating the transaction referring to the object is complete and, in response to receiving the message, unlocking the record for the object.

* * * * *